Sept. 13, 1932.   M. A. GORDON   1,877,299
PROCESS FOR THE RECOVERY OF CHICLE AND
SIMILAR GUM FROM FILTER PRESS RESIDUE
Filed Oct. 16, 1931   2 Sheets-Sheet 1

INVENTOR
Marcus A. Gordon
BY H. Lee Helms
ATTORNEY

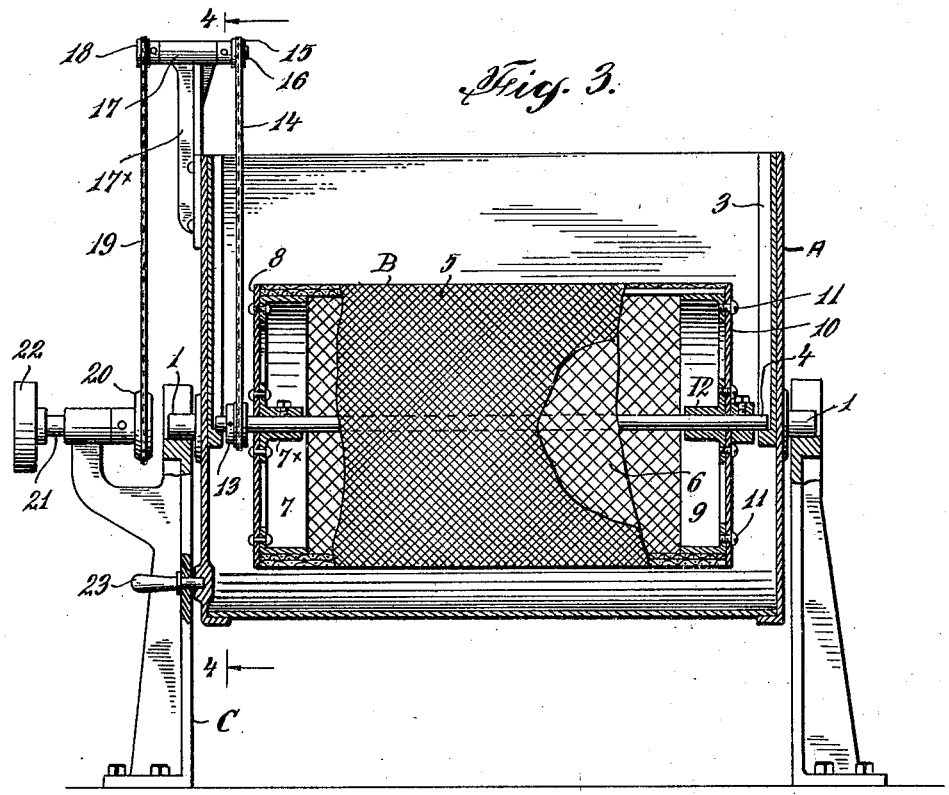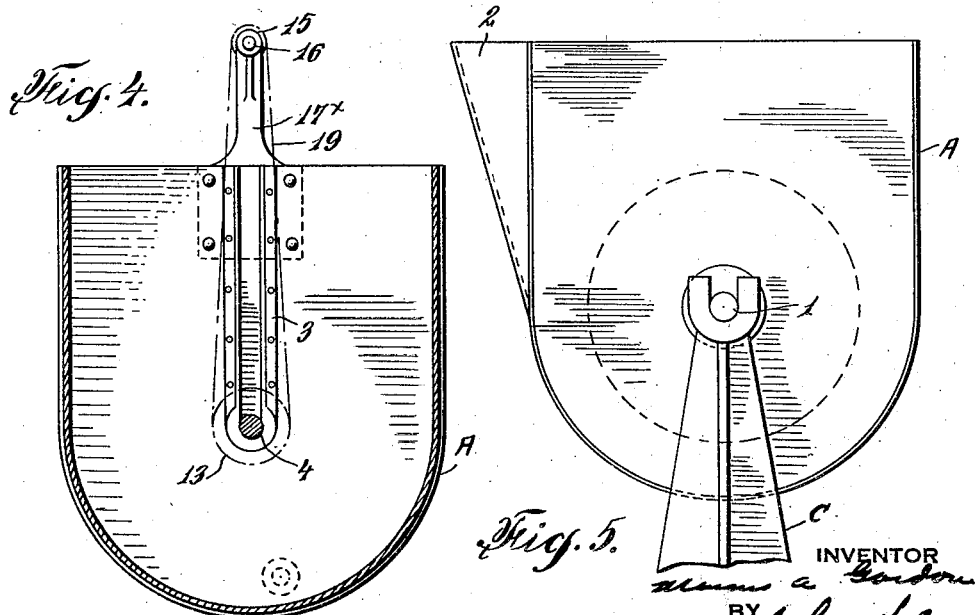

Patented Sept. 13, 1932

1,877,299

UNITED STATES PATENT OFFICE

MARCUS A. GORDON, OF LITTLE NECK, NEW YORK, ASSIGNOR TO AMERICAN CHICLE COMPANY, OF LONG ISLAND CITY, NEW YORK, A CORPORATION OF NEW YORK

PROCESS FOR THE RECOVERY OF CHICLE AND SIMILAR GUM FROM FILTER PRESS RESIDUE

Application filed October 16, 1931. Serial No. 569,274.

This application being a continuation in part of my application filed June 13, 1928, Serial No. 284,935 of which the following is a specification:

In the purification of raw chicle and similar gum, in one process, the melted gum is passed through a filter press containing, in addition to the usual filter screens, a material, such as saw dust, which assists in separating foreign matter such as dust, bark, fragments of leaves, etc., from the gum mass. When the filter press material has been in use for a length of time, it can no longer be used advantageously because of its contained foreign matter, and it has been customary to eject the material as waste from the filter press, notwithstanding the fact that the material contains a large proportion of gum, frequently 50%. It is the object of the present invention to recover the gum from the filter press residue by a process which will enable the use of the gum in the manufacture of chewing gum, and hence will not add to the gum an unpleasant flavor or odor, nor seriously affect the fibre of the gum.

The invention will be understood by reference to the accompanying drawings illustrating an apparatus for use in the process. In the drawings—

Figure 3 is a vertical section through the extraction tank and cage.

Figure 4 is a sectional elevation on the line 4—4, Figure 3, and

Figure 5 is an end view of the extraction tank.

Figure 1:
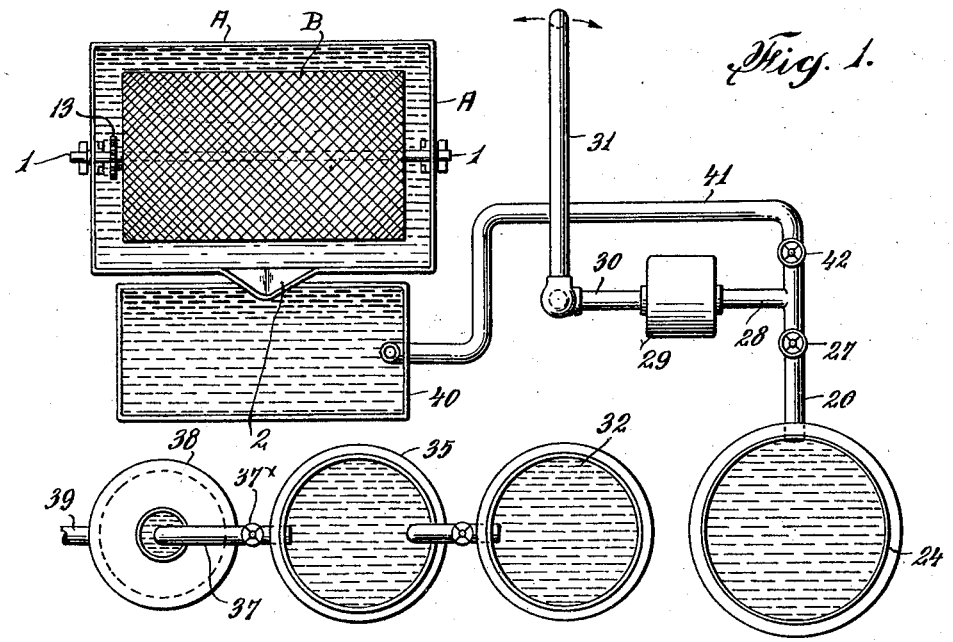
Figure 1 is a plan view showing certain apparatus employed in the process.
Figure 2:
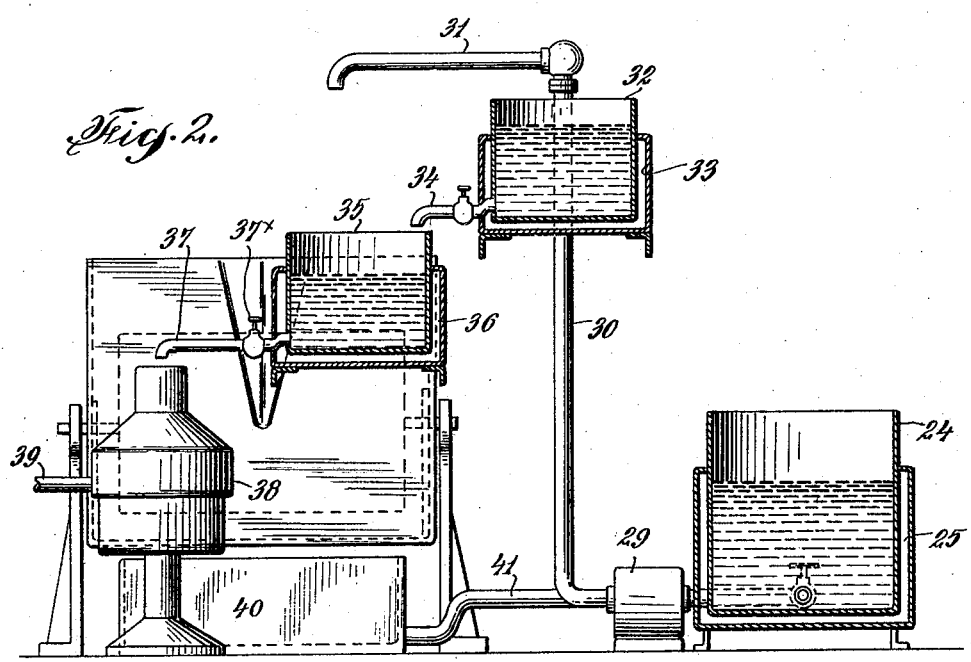
Figure 2 is a sectional elevation of certain of the elements shown in Figure 1.

In the process I employ an extraction tank A which, in the present instance, is mounted on trunnion supports at 1 so that it may be rocked to discharge its contents via a spout 2. Each end wall of the tank carries a U-shaped support 3 for the shaft 4 of an extracting cage indicated generally at B. The cage comprises an outer cylindrical screen 5 adjacent inner cylindrical screen 6, the screen-cylinders at one end being received upon a ring 7 having a hub 7× fixed to shaft 4.

An end closure plate 8 is connected to the ring and to hub 7×. The screen-cylinders at the opposite end are mounted upon a flanged ring 9 to which is removably connected a plate 10 secured in position by the screens 11 to the ring and to a hub 12 on shaft 4. Access to the interior of the extraction cage may be obtained in any suitable manner as by removing plate 10, or a section of the plate may be removable.

Shaft 4 carries sprocket 13 driven by a chain 14 from a sprocket 15 on shaft 16. The shaft 16 is mounted in the boss 17 of a bracket 17× secured to the extraction tank. Shaft 16 carries a sprocket 18 connected by chain 19 with a sprocket 20 on a shaft 21 carrying a pulley 22. If desired, shaft 21 can be rotated by direct motor drive. A detent pin 23 in frame member C may enter an aperture in the extraction tank to hold the same against movement on the trunnions. It will be noted the shaft 21 has the same axis as the axis of movement of the tank. Therefore, the tank may be moved on its axis to pour out its contents without affecting the chain connections intermediate shaft 4 and shaft 21.

Tank 24 is employed for holding the solvent, the tank being steam jacketed as in 25 so that the solvent may be heated in any desired temperature. A pipe 26 controlled by valve 27 leads to a branch pipe 28 operatively connected to a pump 29, the pump discharging into a swivel nozzle 31 at the upper end of branch pipe 30.

Nozzle 31 may swing in an arc and into register with an elevated tank 32, steam jacketed at 33, the tank having a valve control discharge outlet 34, leading to a second tank 35, steam jacketed at 36 and having a valve control discharge outlet 37.

Outlet 37 of tank 35 is in register with a centrifuge 38 having a discharge outlet 39.

The extraction tank discharges via nozzle 2 into a collection bowl 40, the latter being connected by pipe 41 with pump 29. Pipe 41 may be shut off from the pump by means of a valve 42.

In the operation of the process the extraction cage B is loaded with filter press residue.

To enable this, the cage may readily be removed from the tank and cover plate 10 detached. After the cage is loaded, it may be restored to the extraction tank. The tank is steam jacketed or provided with other heating means. Carnauba wax or its equivalent is placed in melting tank 24, and is melted, as by the application of steam, to the jacket 25. When the melting is completed valve 42 is closed, valve 27 opened, and pump 29 thrown in operation. A sufficient quantity of molten wax is then pumped in the extraction tank, nozzle 31 being swung over the tank for that purpose. The extraction tank may, as an example, be one-third filled with molten wax. A cover may then be placed on the extraction tank and the steam or other heating medium applied.

The extraction cage B is then revolved by the means above described, and this rotation of the cage may continue for such a period as to cause the molten wax to thoroughly penetrate the filter residue and dissolve and absorb the gum contained thereby.

For example, the cage may be revolved for two hours. The detent 23 is then withdrawn and the extraction tank is tilted so that the solvent with its absorbed gum may be poured into bowl 40. Valve 27 is then closed and valve 42 opened. Nozzle 31 is then swung over into register with settling tank 32, while pump 29 is thrown into operation. The material from the bowl is thus pumped into settling tank 32, the tank having been previously heated by admission of steam to the jacket 33. The material is permitted to stand in the settling tank 32 for a period of time sufficient to enable foreign material which may have passed through the screens to settle at the bottom of the tank, and then the material is run off through nozzle 34 into second settling tank 35. In the meanwhile a fresh supply of the solvent wax is pumped from melting tank 24 into the extraction tank. When the settling in tank 35 is completed, it is passed through nozzle 37 into the centrifuge 38. The centrifuging may now take place or it may await the second solvent extraction treatment of the residue within the cage. In the second treatment the residue within the rotation cage B is subjected to the solvent for an adequate length of time, say one hour, the heat of the solvent being maintained as by a steam jacket around the extraction tank A or any other suitable heating means. When the treatment is completed the extraction tank is tilted, the wax with its absorbed gum is poured into the collection bowl, the pump is operated to transfer the liquid material to the first settling tank 32 and the process continues to the passage of the liquid material to the centrifuge.

In the operation of the centrifuge, the latter is preferably heated and the heat maintained. When the speed of the centrifuge is several hundred R. P. M., enough wax is run in to almost fill the bowl, and when the centrifuge has reached its maximum speed, say 6000 R. P. M., the valve 37$^\times$ of the discharge nozzle 37 is completely open and the material is permitted to run freely into the centrifuge and from the centrifuge through outlet pipe 39 to containers.

The amount of wax placed in melting tank 24 may be that sufficient for the two solvent extraction steps. After said steps have been completed, a quantity of oleo stearin is placed in the melting tank, for example, 75 pounds of oleo stearin to an initial of 150 pounds filter press residue. The hot fluid oleo stearin is pumped into the extraction tank, the cage rotated for a period, say one hour, at the end of which the oleo stearin with its content of gum and carnauba wax or its equivalent is poured into the collection bowl and passed to the centrifuge for treatment in the same manner as the initial centrifuging of the wax-base mixture.

The final step is to rotate the cage in boiling water for a period of time, say one hour, after which the extraction tank is tilted and the liquid poured through a gravity separator, the mixture, wax and gum being collected in containers.

The primary process is the subjection of the agitated mass of filter press residue, comprising chicle and similar gums, filter material, etc. in the presence of a solvent material which is fluid when heated and which becomes solid or semi-solid upon cooling so that with its absorbed gum it becomes a compound suitable for use as a primary chewing gum constituent.

In other words, the solvent need not be free from the recovered chicle and thus further treatment with consequent cost is unnecessary. The essential of the process is thus had when the agitated filter press material is subjected to the hot solvent for a sufficient time to enable the latter to take up a substantial proportion of the chicle or similar gum, and the solvent with its absorbed gum is removed from the extraction tank. The further treatments are in the nature of refinements.

Thus I use for recovering the gum from the filter press residue, a substance which has a property to dissolve the gum and to leave undissolved other ingredients in the residue from the filter press. While many substances could be used for the same purpose from the standpoint of solubility, for my purpose only a certain kind of material may be used. Since the extracted materials, that is, gum and the solvent material, are intended for re-use in chewing gum, the extractor should be of such a nature which is not injurious to the health when taken through the mouth.

Another point, which governs the choice of such a solvent, is its physical nature and its action on the fibre of the gum. It is well known to those skillful in the art that the chewing properties of the gums employed for the preparation of chewing gum are considerably modified by the addition of foreign substances. In many cases, such an addition changes the structure of the gum so profoundly that it becomes unsuitable for chewing purposes. It was, therefore, necessary to investigate a great number of substances, not only for the purpose of serving as an extractor of gum from the filter press residue, but also from the point of view of preserving the desirable chewing properties of the gum. It should be mentioned, in this connection, that the preservation of the proper chewing qualities of the mixture of the extracted gum and solvent material is very important from an economical standpoint, because if, after extraction of the gum from the filter press residue, it would be necessary to free the gum from the solvent, the practical value of the process would be considerably diminished.

This leads to the third requirement which is necessary for making the proper choice of the solvent material; that is, the proper physical state of such a solvent material. The above solvent material should be of such a nature, which, when cold, does not change the physical state of the gum greatly, in order that with the absorbed gum, it becomes a compound suitable for use, as a primary chewing gum constituent. On the other hand, the above solvent material should, under certain conditions, acquire the state at which it is easily and ultimately miscible with the filter press residue for the obvious reason to facilitate the extraction of the gum.

To satisfy the first condition, that is, the proper physical state for a primary chewing gum ingredient, the solvent material, in question, should be in a solid state at the ordinary temperature. On the other hand, it is known that the increase in temperature and the liquid state are conditions which favor the solvent action in the majority of cases. In order to satisfy these last two conditions, the solvent material, for the purpose of extraction of the gum from the filter press residue, should be such which is fluid when heated and which becomes solid or semi-solid upon cooling.

In selecting the solvent material, which is to remain with the gum and which is to be used as a primary ingredient for making the chewing gum, it should not be forgotten that a chewing gum base is very closely associated with the class known as solid colloids, and consequently the material, which is added to the gum, shall not change this colloidal state.

When studying the possibility of properly satisfying all three principal requirements, which have been mentioned above, that is, freedom from injurious action on the health, preservation of proper chewing qualities, and the proper physical state at the given temperature, I found that organic substances known under the name of waxes are non-poisonous; they are solid, when cold, and become fluid when heated, and they have a solvent power toward the natural gums used in the chewing gum industry.

Carnauba, candelilla, and beeswax, as well as their inorganic derivatives (such as carnaubates and similar products) may be given as an example in this connection.

I also found that other substances, belonging to the class of fatty acids and their salts, may be suitable for my purpose. Among such substances, oleo stearin, hydrogenated (hardened) oils, and hard soaps may be mentioned.

Having described my invention, what I claim and desire to secure by Letters Patent, is as follows:—

1. A method of recovering chicle and similar gum from filter press residue which comprises agitating the residue in the presence of a solid waxy material having a definite characteristic in that it is substantially innocuous to and capable of mixture with chicle, the said waxy material being in hot fluid state, draining off said material with its absorbed gum, and restoring the solid form of the compound ingredients by cooling.

2. The process for recovery of chicle and similar gums from filter press residue which consists in agitating the filter press residue in the presence of hot fluid carnauba wax or its equivalent, draining off the wax with its absorbed gum and restoring the solid form of the two ingredients of the compound by cooling.

3. A process for recovery of chicle and similar gums from a mass of woody foreign material containing them or one of them, which consists in subjecting said mass to agitation in the presence of normally solid solvent material of a definite characteristic in that it is substantially innocuous to and capable of mixture with chicle, said material being maintained in fluid condition by heat, draining off the fluid with its absorbed gum and restoring the solid form of the compound ingredients by cooling.

4. A process for the recovery of chicle and similar gums from woody foreign material which consists in the subjection of an agitated mass of said material, with the gum entrapped thereby, to the presence of a solvent material which is fluid when heated and which becomes solid or semi-solid upon cooling, maintaining the fluid condition of said solvent material during said agitation, draining off said material with its absorbed gum, and restoring the said two substances to solid condition by cooling, said solvent material being of a definite characteristic in that it is substantially innocuous to chicle and capable of mixture therewith.

5. A process for the recovery of chicle and similar gums from woody foreign material which consists in agitating said material, with its entrapped gum, in the presence of molten carnauba wax or its equivalent, draining off the wax with its absorbed gum, further agitating the said body of woody material to molten oleo stearin, draining off the oleo stearin with its content of carnauba wax or its equivalent and gum, and subjecting the same to settling and centrifuge operations.

In witness whereof, I have signed my name to this specification.

MARCUS A. GORDON.